Aug. 11, 1925.

L. O. FRENCH 1,549,482

INTERNAL COMBUSTION ENGINE

Filed March 30, 1923

INVENTOR
Louis O. French

Patented Aug. 11, 1925.

1,549,482

UNITED STATES PATENT OFFICE.

LOUIS O. FRENCH, OF MILWAUKEE, WISCONSIN.

INTERNAL-COMBUSTION ENGINE.

Application filed March 30, 1923. Serial No. 628,903.

*To all whom it may concern:*

Be it known that I, LOUIS O. FRENCH, a citizen of the United States, and resident of Milwaukee, in the county of Milwaukee and State of Wisconsin, have invented new and useful Improvements in Internal-Combustion Engines, of which the following is a description, reference being had to the accompanying drawings, which are a part of this specification.

The invention relates to internal combustion engines, and more particularly to those using liquid fuel.

The engine embodying the invention may be classed as a liquid fuel gas injection engine, but, unlike the usual engines of this class, is designed to operate under moderate compression pressures so that special provision has to be made for the vaporization of the fuel while in the precombustion chamber and the ignition thereof after it has been ejected therefrom into the main combustion chamber.

This application is a continuation in part of an application filed by me on Nov. 25, 1921, Serial No. 517,745, for internal combustion engines, as to common claimable subject-matter therein, and in addition is an improvement on said earlier application by providing for a more efficient distribution of the fuel as it is ejected from the precombustion chamber into the air in the main combustion chamber, good turbulence in the mixture in the main combustion chamber, and a quick ignition of its gaseous contents.

Another object of the invention is to provide a liquid fuel gas injection engine in which vaporization of the fuel charge and the subsequent mixing and burning may be carried out rapidly and under medium compression pressures so that relatively high speeds may be used compared to those commonly employed in the usual heavy oil engines.

The invention further consists in the several features hereinafter set forth and more particularly defined by claims at the conclusion hereof.

Figure 1:
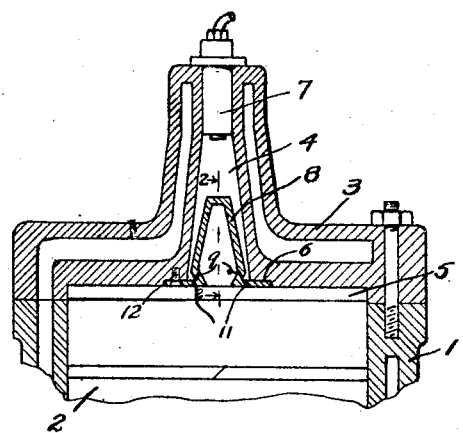
Figure 2:
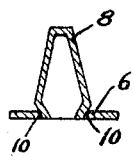
Figure 3:
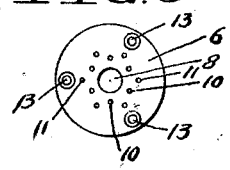

In the drawings: Fig. 1 is a detail sectional view through an engine embodying the invention; Fig. 2 is a detail section through the partition taken on the line 2—2 of Fig. 1; Fig. 3 is a plan view of the partition.

In the drawings the numeral 1 designates the cylinder of the engine, 2 the piston working therein and 3 the cylinder head.

The combustion chamber is divided into two parts, a precombustion chamber 4 and the main combustion chamber 5, by means of a partition 6 provided with openings, hereinafter described, affording restricted communication between the chambers. The volume of the chamber 4 is smaller than that of the chamber 5 so that the fuel is vaporized or gasified in a relatively small amount of air and by its localized burning and expansion is expelled from said precombustion chamber into the main combustion chamber, preferably near the end of the compression stroke.

A fuel injector of any suitable construction is used to inject the liquid fuel into the chamber 4 and is preferably arranged to face the partition. The injector 7 here shown is of the usual spray jet type.

The partition 6 is provided with a hot tube projection 8 and openings 9, 10 and 11 are provided at or near the base portion of this tube 8. The tube is shown as having conically sloping walls 12 so that the fuel spray will strike a greater part of its surface. This tube makes it certain that the air in the vicinity of the openings 9, 10 and 11 will be highly heated; that the air passing said openings into the chamber 4 and along the passage formed between the tube and the lower end portion of the chamber 4 will be highly heated, and that fuel directed against it will be rapidly gasified. Thus, one of the functions of the hot tube 8 is to supply heat to the chamber 4 to vaporize the fuel. As the tube 8 opens into the combustion chamber it also performs the functions of a hot tube ignitor.

It will be noted that the opening or openings 9 are inclined toward the axis of the tube and introduce a portion of the vaporized fuel into the tube so that the air within the tube is immediately mixed with the fuel to form a quick burning or even explosive mixture in the tube.

It will also be noted that the openings 10 are inclined toward the axis of the tube so as to introduce streams of gasified fuel into the combustion chamber below the openings of the tube to meet the charge of burning fuel expelled from the tube, and that the other openings 11 are provided to introduce other streams of gasified fuel into the combustion chamber 5 and, as shown, these streams diverge from the axis of the tube.

Assuming that the engine has been started and has become heated up so that the tube 8 is in a highly heated state, then during each cycle of operations air introduced into the chamber 5, either by two or four-cycle operation, is compressed on the upward stroke of the piston and some of the air passes through openings 9, 10 and 11 into the chamber 4. At the proper time, preferably during the compression stroke, fuel is introduced into the hot air in the chamber 4 by the injector 7. The time of injection will depend upon the compression pressure used, the speed of the engine, and also upon the heating effect of the hot surface portion of the chamber 4. As the piston moves out on its power stroke the fuel in the chamber 4 will be ejected through the openings 9, 10 and 11 into the main combustion chamber 5, partly by the pressure generated by the gases expanding in the chamber 4 and partly by reason of the suction effect of the piston, and aided by the ignitor 8 will be burned in the air in the chamber 5. By the present construction the fuel passing through openings 9 is injected directly into the tube 8 and forms a quick-burning or explosive mixture with the air therein which is ignited by the hot walls of the tube and is expelled by the action of the tube into the main portion of the chamber 5 and meets the streams of fuel from the openings 10 and sets up a turbulent action throughout the gas in the chamber 5 and at the same time aids in the rapid propagation of flame throughout the mixture formed by the introduction of the fuel through the openings 10 and 11. It will be noted that the location of the tube 8 in the main combustion chamber permits it to readily retain its heat and insures combustion at reduced loads. Where the compression pressures used are not high enough to start the engine from cold then any suitable ignition device in or in communication with the chamber 4 may be used on starting. As soon as the engine warms up the tube 8 becomes sufficiently hot to insure ignition without the aid of the starting plug or ignition device.

While the openings 9, 10 and 11 should be relatively small, they need not necessarily be so fine as to be relied upon to atomize the fuel because the injector 7 itself, if properly designed, will split up the liquid fuel so that by its contact with the heated air and the hot partition it will be split up and wholly or partly gasified before leaving the chamber 4. To secure the expulsive effect of the hot tube 8 the openings 3 are arranged adjacent its lower end. The outlet of the tube 8 may be more or less restricted so as to retard the flow from the tube, if desired, and the more it is restricted the greater tendency there will be to trap the hot exhaust gases in it and thereby retard combustion in the tube, which may be desirable under some conditions of operation.

The partition 6 may be secured to the head in any suitable manner, as by screws 12 passing through openings 13.

The number of the openings in the partition may be varied and will vary with the size of the engine but the total area of these openings should preferably be as to maintain such a difference in pressure between the chambers 4 and 5 during ejection.

The construction above described has been designed especially with reference to high speed engines of the automotive type and for using medium compression pressures (200-350 # sq. in.) so that high speed may be attained and so that the engine may be made lighter than those oil engines of the gas injection type which depend upon the heat of compression for ignition.

By the term "hot tube" as used in this specification and claims, I mean a tube having one end, that is, the end that extends into the precombustion chamber, closed. With such a tube the expulsive effect of the combustible products within the upper end portion of the tube into the main combustion chamber is obtained, thereby promoting efficient combustion of the charge in said main combustion chamber, and, furthermore, an efficient heating and retention of heat at the closed end portion of the tube is assured.

I desire it to be understood that this invention is not to be limited to any specific form or arrangement of parts except in so far as such limitations are specified in the claims.

What I claim as my invention is:

1. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber and with an opening at the outlet end portion of the tube directing fuel into the tube.

2. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber, said partition having relatively small openings at the outlet end portion of the tube, one of said openings directing fuel from said precombustion chamber into said tube toward the closed end thereof and another of said openings directing fuel into the main part of the main combustion chamber and toward the outlet of said tube.

3. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber, said partition having openings at the outlet end portion of the tube affording restricted communication between the chambers, one of said openings directing fuel from said precombustion chamber into said tube toward the closed end thereof, and other openings directing fuel into the main part of the main combustion chamber.

4. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber, said partition having openings at the outlet end portion of the tube affording restricted communication between the chambers, one of said openings directing a fuel stream from the precombustion chamber toward the closed end of the tube, other of said openings directing fuel into the main part of the combustion chamber toward the axis of said tube and other openings diverging from the axis of the tube and directing fuel into the main combustion chamber.

5. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber, said partition having openings affording restricted communication between said chambers and arranged to introduce fuel into said tube to form an explosive mixture therein as the fuel charge is introduced into the main combustion chamber.

6. In an internal combustion engine, the combination with the main combustion chamber, of a precombustion chamber, means for introducing fuel into said precombustion chamber, and a partition between said chambers provided with a hot tube having a closed end portion extending up into the precombustion chamber and having a restricted outlet opening into the main combustion chamber, said partition having openings affording restricted communication between said chambers and arranged to introduce fuel into said tube and into the main part of the main combustion chamber.

7. In an internal combustion engine, the combination with the main combustion chamber, of a precombustion chamber, means for introducing fuel into said precombustion chamber, and a partition between said chambers provided with a hot tube having a closed end portion extending up into the precombustion chamber and its open end opening into the main combustion chamber and with means for directing fuel from the precombustion chamber into the tube and into the main part of the main combustion chamber.

8. In an internal combustion engine, the combination with the main combustion chamber, of a precombustion chamber, an apertured partition between said chambers affording restricted communication between them, said partition being provided with a hot tube projection extending up into the precombustion chamber and opening into the main combustion chamber, and means for introducing fuel into said precombustion chamber.

9. In an internal combustion engine, the combination with the main combustion chamber, of a precombustion chamber, a partition between said chambers provided with a hot tube projection extending up into the precombustion chamber and opening into the main combustion chamber, said partition having an opening at the outlet end portion only of said tube, and means for introducing fuel into said precombustion chamber.

In testimony whereof, I affix my signature.

LOUIS O. FRENCH.